Nov. 4, 1952     K. MILLER     2,616,540
AUTOMATIC WEAR COMPENSATOR FOR FRICTION CLUTCHES
Filed Dec. 29, 1948     2 SHEETS—SHEET 1

Inventor
Kay Miller

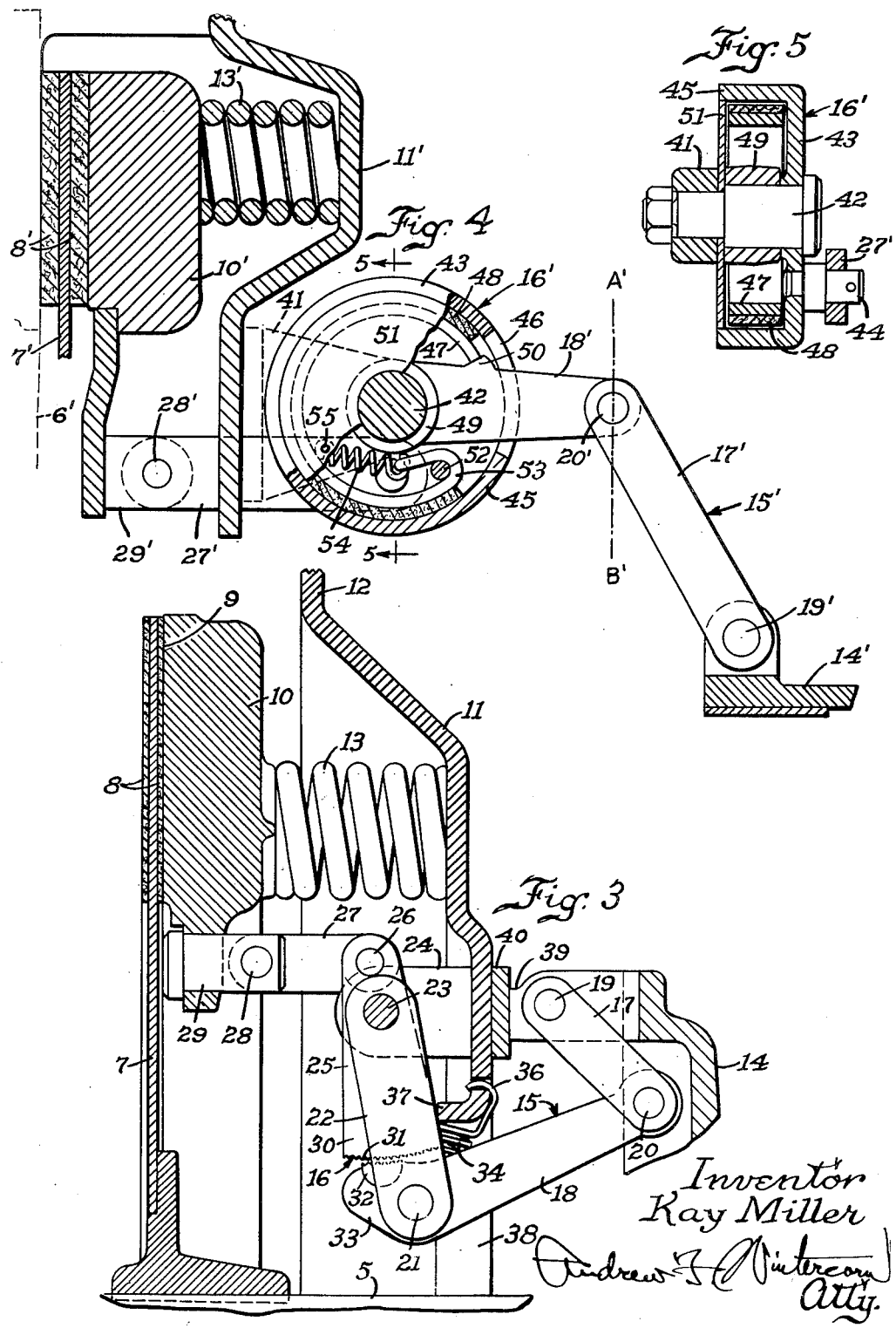

Patented Nov. 4, 1952

2,616,540

UNITED STATES PATENT OFFICE 2,616,540

AUTOMATIC WEAR COMPENSATOR FOR FRICTION CLUTCHES

Kay Miller, Muskegon, Mich., assignor to Dana Corporation, Toledo, Ohio, a corporation of Virginia Application December 29, 1948, Serial No. 67,974

30 Claims. (Cl. 192—111)

This invention relates to friction clutches generally and more particularly over-center type clutches, such as are used on tractors and for other heavy duty purposes, the principal object of the present invention being to provide a constant pressure or spring loaded clutch of the kind mentioned embodying an automatic wear compensating feature, whereby to eliminate the necessity for any adjustments, so that nearly all the facing material can be worn off before the clutch requires servicing.

Over-center clutches, as pointed out in Patent No. 2,251,366, issued to W. Vincent Thelander and myself, were subject to the objection that even a small amount of wear on the clutch disk facings caused an appreciable reduction in the engaging pressure and resulted in excessive slippage, thereby accelerating the wear on the facings and necessitating more frequent accurate adjustments by specially skilled mechanics. The improvements disclosed in the patent just mentioned succeeded in providing an over-center type clutch obtaining substantially constant engaging pressure regardless of wear provided adjustments were made from time to time, the design being such that the clutch operated satisfactorily with fairly coarse adjustments. With my present invention, I eliminate the necessity for even these periodic adjustments and, incidentally, obtain a cheaper construction and one which gives uniform operating characteristics, the release lever travel and pressure remaining unchanged as the facings wear off.

In the clutch actuating mechanism embodying the wear compensating feature provided in accordance with my invention, a linkage somewhat similar to that disclosed in my Patent No. 2,287,630 is employed between the throw-out collar and the pressure plate to retract the pressure plate against the action of the engaging springs when the throw-out collar is moved to one extreme position, and allow engagement of the clutch under spring pressure when the throw-out collar is moved to the opposite extreme position. However, one of the links carries an arcuate faced shoe which is guided for movement in an arc by another link along the arcuate periphery of a segmental-shaped bell-crank lever that is link-connected with the pressure plate, and this shoe is arranged to be moved into and out of engagement with said arcuate periphery in the back and forth movement of the throw-out collar in disengaging and re-engaging the clutch, the shoe being automatically disengaged from the periphery of the segment when the clutch is engaged, so that whatever facing wear occurs during such engagement, slight as it may be, will be compensated for by the changed relationship which the shoe assumes with respect to the periphery of said segment when the clutch is disengaged, the shoe taking hold on the periphery of the segment automatically in the first movement of the throw-out collar toward released position, so that the travel of the throw-out collar is always the same and likewise the retraction of the pressure plate with respect to the clutch disk, regardless of the extent to which the clutch disk facings may be worn off. Spring means is employed in connection with the guide link to move it into engagement with a stop on the back plate when the shoe is disengaged from the segment, whereby to operate always from this set position as a reference point when the shoe takes hold again on the periphery of the segment and accordingly insure the same full disengagement of the clutch upon each operation of the throw-out collar regardless of the extent of facing wear.

The invention is illustrated in the accompanying drawings, in which—

Fig. 3 is still another similar section, showing the clutch engaged, but illustrating the changed relationship of the parts of the clutch actuating mechanism due to the amount of facing wear indicated on the clutch disk;

Fig. 4 is a longitudinal section through another over-center type clutch, made in accordance with my invention, embodying a different wear compensating structure, and Fig. 5 is a section on the line 5—5 of Fig. 4.

Similar reference numerals are applied to corresponding parts throughout the views.

Figure 1:
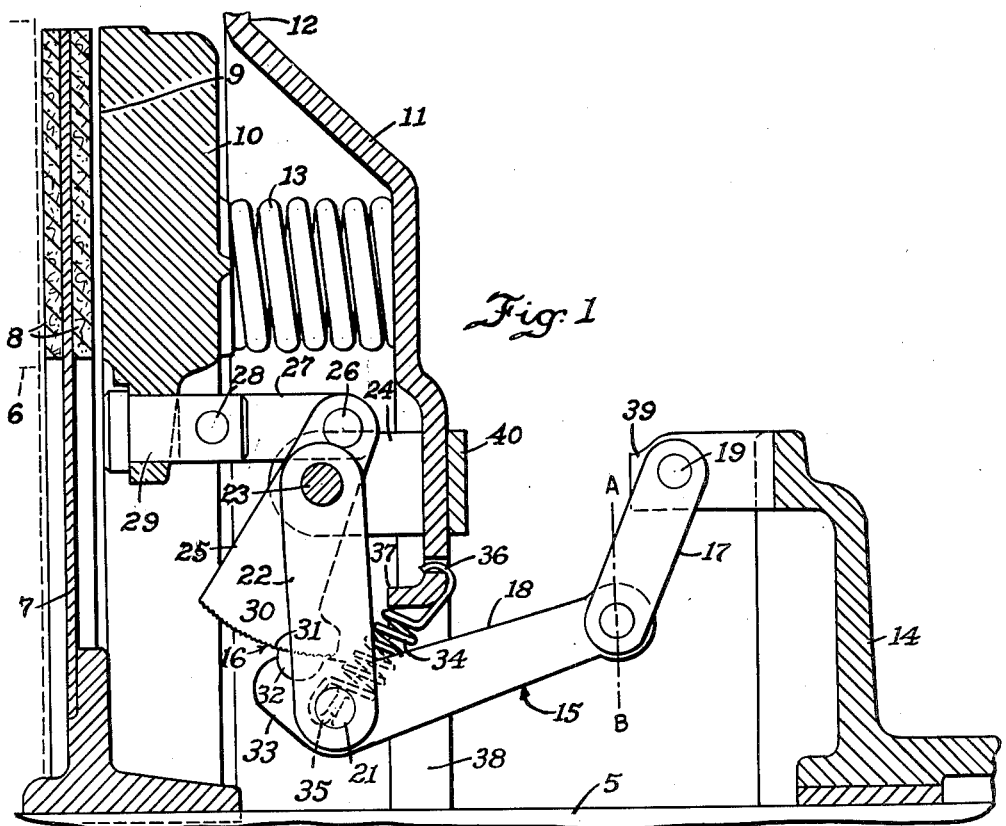
Fig. 1 is a longitudinal section through an over-center type clutch made in accordance with my invention, showing the same in disengaged position.
Figure 2:
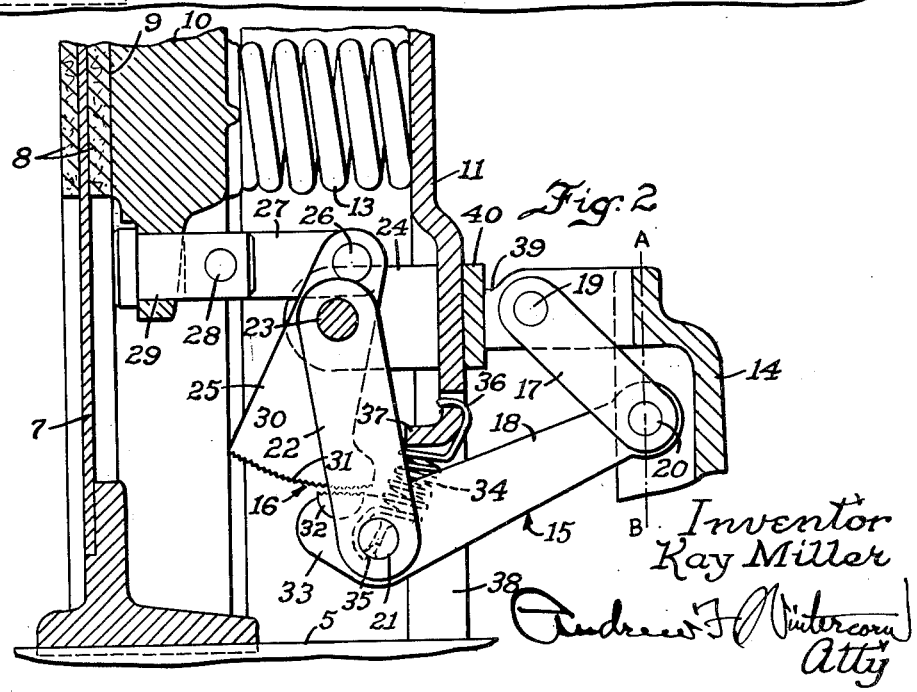
Fig. 2 is a similar section showing the clutch engaged.

Referring to Figs. 1 to 3, the clutch shown is designed for application to the usual flywheel on the crankshaft of an internal combustion engine. 5 is the driven shaft extending rearwardly from the flywheel 6 and clutch into the gear box of the transmission, in the usual way, and supported at its front end at the center of the flywheel. 7 is the clutch disk, the center hub 8 of which is splined on the front end of the shaft 5 to transmit drive from the flywheel 6 to the shaft 5 when the clutch is engaged. The usual pads or facings 8 on the clutch disk are engageable with the driving face on the flywheel and the companion driving face 9 on the pressure plate 10. The latter is suitably cast like the flywheel, the face 9 being accurately machined in insure smooth clutch engagement. The back plate 11 is also a casting and is arranged to be bolted by its rim portion 12 to the rim of the flywheel. Suitable means (not shown) is provided for transmitting drive from the flywheel through the back plate to the pressure plate, while allowing axial movement of the pressure plate relative to the flywheel, as required in the engagement and disengagement of the clutch. Coiled compression springs 13 acting between the back plate and the pressure plate urge the latter normally toward the flywheel to engage the clutch. Engagement and disengagement of the clutch is controlled by movement of the throw-out collar 14 toward and away from the back plate, the same being shown in retracted position in Fig. 1, corresponding to the disengaged position of the clutch, and being shown in its forward position in Figs. 2 and 3, corresponding to the engaged position of the clutch. The throw-out collar is operable in the usual way by a conventional fork, which, in turn, is operated by a manually shiftable release lever. The linkage system 15 operatively connects the throw-out collar 14 with the pressure plate 10 to move the latter back and forth in response to the back and forth movement of the throw-out collar and lock the same in either of its extreme positions by virtue of movement of the linkage "over-center," and this linkage system, in accordance with my invention, includes an automatically adjustable wear compensating clutch connection 16, which compensates for whatever wear occurs on the facings 8 during each and every engagement of the clutch, so that the clutch adjustments otherwise required from time to time are dispensed with and the clutch requires no servicing until the facings have been worn thin.

The linkage system 15 includes over-center means in the form of a pair of toggle links 17 and 18 pivotally connected, as at 19, to the throw-out collar 14, and pivotally connected together, as at 20, for movement of link 17 back and forth to opposite sides of a dead center relationship, indicated by the dot and dash center-line A—B appearing in Figs. 1 and 2. Link 18 is also a bell-crank member and is pivotally connected at its outer end, as at 21, with one end of another link 22, which, in turn, is pivoted at its other end, as at 23, on a post 24 that is suitably secured to and projects forwardly from the back plate 11. Carried on the same pivot 23 is a second bell-crank member 25, the pivot 23 being intermediate the ends thereof. One end of bell-crank member 25 is pivotally connected, as at 26, with the rear end of a pressure plate actuating link 27 that is pivotally connected at its forward end, as at 28, with a post 29 projecting rearwardly from and suitably secured to the pressure plate 10. The other end portion 30 of bell-crank member 25 is segmental-shaped and its arcuate periphery 31 is struck on an arc with the pivot 23 as a center. Bearing in mind that the center about which the arcuate periphery 31 of bell-crank 25 is struck is the pivot 23, and that the link 22, which supports the other bell-crank 18, swings on this same pivot as a center, it should be evident that the clutching end 32 of bell-crank 18 is adapted to engage the periphery 31 the same way in every disengagement of the clutch regardless of the very slight changes in angularity of bell-crank 25 incident to the wearing away of the facings 8 on the clutch plate. Engagement occurs at 31—32 after only a very slight rearward movement of the throw-out collar 14, as should be evident from Figs. 2 and 3. The periphery 31 is shown as finely serrated or toothed transversely, but it may be merely roughened, as by knurling, sufficiently to insure more or less positive frictional gripping of the shoe 32 that forms the clutching end of the bell-crank 18 and is carried on the projecting end portion 33 of said bell-crank member 18, the shoe 32 having its gripping face struck on the same radius as the surface 31 and being finely serrated or toothed transversely (or knurled) to match the surface 31. A coiled tension spring 34 is attached at one end to a projecting end portion of pivot pin 21, as indicated at 35, and at the other end to the back plate 11, as at 36, and urges the link 22 rearwardly into engagement with the stop 37 defined by an annular flange provided on the back plate outlining the central circular opening 38 provided therein. The rearward movement of the throw-out collar 14 is suitably limited by its engagement with a positive stop, and its forward movement is limited by engagement of the forwardly projecting boss 39 on the collar with a striker plate 40 provided on the back of the back plate.

In operation, when the clutch is engaged, as shown in Fig. 2, shoe 32 is in spaced disengaged relation to the periphery 31 of segment 30, so that springs 13 bearing against the pressure plate 10 hold the clutch engaged under their full pressure regardless of whatever wear there has been on facings 8, link 22 under these conditions being held in engagement with stop 37 under action of the tension spring 34. However, when the clutch is to be disengaged, the clearance between shoe 32 and surface 31 is taken up in the initial slight amount of clockwise movement of link 18 around pivot 21 as a center incident to the first slight rearward movement of throw-out collar 14, so that link 18 becomes rigidly connected at 31 with bell-crank member 25 from that point on in the further clutch disengaging movement of collar 14, to retract pressure plate 10 against action of springs 13 to the extent shown in Fig. 1. Stop 37 serves to back up link 22 in this initial clutch disengaging movement of collar 14 so that the link 22 will not swing rearwardly as the collar 14 moves to the rear, and, therefore, shoe 32 is engaged with surface 31 in the very first slight rearward movement of collar 14. By the same token, it follows that the clutch actuating mechanism operates positively throughout the major portion of the forward clutch engaging movement of the collar 14, the shoe 32 remaining engaged with surface 31 until near the forward limit of movement of the collar 14. In the movement of link 17 in either direction past the dead-center A—B, shoe 32 is fully engaged with surface 31, and, hence, springs 13 act to hold the throw-out collar 14 in the disengaged position when the link 17 has been moved to the rear past the dead-center position, whereas springs 34 (of which there will be at least one for each of a plurality of linkages 15 on each clutch) will hold the throw-out collar in engaged position, springs 13 being active toward engagement of the clutch as soon as link 17 is moved forward past the dead-center position, but, while holding the pressure plate 10 in engaged position, being in disconnected relationship to the toggle links 17—18 as soon as the shoe 32 becomes disengaged from surface 31 at the end of the clutch engaging movement of collar 14. As shown in Fig. 3, when the facings 8 have been worn quite thin and will soon have to be replaced, the segment 30 comes into engagement with stop 37, and, hence, the subsequent slippage of the clutch, which follows closely on the heels of the parts reaching this extreme relationship, is a signal to the operator that the time has finally arrived for servicing the clutch. The present construction is not only economical to manufacture, but, besides giving the freedom from expensive servicing, by eliminating the necessity for adjustments at intervals, is of advantage because the release lever travel and pressure or "feel" remain unchanged as the facings wear off, and there is always the same engaging and disengaging movement of the pressure plate, and, consequently, the same spacing of the pressure plate from the clutch disk facings in disengaged position, regardless of the extent of facing wear.

Referring to Figs. 4 and 5, a different kind of automatically adjustable wear compensating clutch connection is illustrated at 16' in the linkage system 15' that operatively connects the throw-out collar 14' with the pressure plate 10', but, as will soon appear, the same kind of operation is obtained, in so far as concerns disconnection of the pressure plate from the throw-out collar throughout periods of clutch engagement, so as to permit facing wear to occur without affecting the release lever travel and pressure or "feel." Clutch parts corresponding to those of Figs. 1 to 3 are given prime numbers in Fig. 4. Thus, over-center means in the form of a pair of toggle links 17' and 18' are pivotally connected at 19' with throwout collar 14' and are pivotally connected together at 20'. Pressure plate 10' is arranged to be held engaged with disk 7' under pressure of springs 13' but may be retracted by a pressure plate actuating link 27', which is connectible with the links 17'—18' by the wear compensating clutch 16' for disengagement of the clutch in the same travel of the release lever operating the throw-out collar. A bracket 41 for supporting the clutch is fixed to the back of the back plate and carries a post 42, on which a clutch drum 43 is rotatably mounted. The drum 43 is pivotally connected at 44 with the outer end of link 27' so that oscillation of the drum results in back and forth movement of the pressure plate 10'. The peripheral flange 45 of the drum has an opening 46 provided therein through which the toggle link 18' projects for cooperation with the backing 47 for clutch band 48, the link 18' being pivoted, as at 49, on post 42 and having a projection 50 for engagement with and oscillation of the clutch band backing 47. A closure plate 51 is suitably fixed to bracket 41 as by pin or post 55 and closes the open side of drum 43. A post 52 projects from the radial side wall of drum 43 in parallel relation to post 42 and has hooked thereon one end of the clutch band backing 47, as at 53. The hooked portion 53 of backing 47 is attached to one end of a coiled tension spring 54, the other end of which is anchored on the aforesaid post 55 extending from bracket 41 through a hole in closure plate 51 and projecting into drum 43 in radially spaced relation to post 42 and parallel spaced relation to post 52.

In operation, when the clutch is engaged, the parts are disposed as in Fig. 4, and springs 13' hold the pressure plate in engaged position regardless of the extent of wear on facings 8'. The opening 46 is of such angular extent that drum 43 may shift its relationship to link 18' considerably as the facings wear off more and more, but clutch band 48 and its backing 47 are always held by spring 54 in contact with link 18' at 50, the drum 43 being free to shift its position slightly relative to the band 48 in a clockwise direction, to the small extent required to compensate for wearing off of facings 8', this shift in relationship of the parts mentioned being without any alteration in the arrangement of the clutch band 48 and its backing 47 relative to link 18', inasmuch as only the post 52 backs away slightly from the hook end 53 of the backing 47 in this change in relationship of the parts. However, when clutch band 48 is expanded by counterclockwise movement of link 18' in response to forward movement of throw-out collar 14', for disengagement of the clutch, it is obvious that drum 43 is turned with the clutch band 48 to retract the pressure plate 10' by means of links 27' against action of springs 13' and accordingly disengage the clutch. In this operation, spring 54 is extended and so will serve to return the band to the normal position shown, when the clutch is later engaged again.

While the invention has been shown and described as applied to over-center type clutches, it should be understood that the principle is also applicable to other clutches.

It is believed the foregoing description conveys a good understanding of the objects and advantages of my invention. The appended claims have been drawn to cover all legitimate modifications and adaptations.

I claim:

1. In a clutch comprising a driving element and a driven element, a pressure plate for holding the driving and driven elements frictionally engaged, and spring means urging the pressure plate toward engaged position, clutch actuating mechanism comprising actuating means connected with the pressure plate for retracting the same against action of said spring means, a throw-out means, over-center means operated by the throw-out means for engagement and disengagement of the clutch, and means including two connectible and disconnectible elements providing an operating connection between said over-center means and the actuating means connected to the pressure plate, and clutching means for said last mentioned elements arranged to automatically disconnect said elements upon operation of said over-center means to a predetermined position for engagement of the clutch and arranged for automatically connecting said elements again in the reverse operation of said over-center means for disengagement of the clutch.

2. A clutch as set forth in claim 1, including spring means urging the clutching means toward a limit position when the clutch is engaged and the connectible elements are disconnected.

3. A clutch as set forth in claim 1, including a back plate against which the spring means for holding the pressure plate in engaged position is engaged, and spring means connected to a part rigid with the back plate for urging the clutching means toward a limit position relative to the back plate when the clutch is engaged and the connectible elements are disconnected.

4. In a clutch comprising a driving element and a driven element, a pressure plate for holding the driving and driven elements frictionally engaged, a back plate, and spring means acting between the back plate and pressure plate tending normally to urge the pressure plate toward engaged position, clutch actuating mechanism comprising a bell-crank member pivoted intermediate its ends on the back plate and connected at one end to the pressure plate to retract the same upon oscillation of said bell-crank member in one direction, a throw-out member movable toward and away from the back plate, pivotally connected toggle links operated by the throw-out member over dead-center for engagement and disengagement of the clutch, the other end portion of said bell-crank member being segmental-shaped and having an arcuate periphery, one of the toggle links carrying a shoe on one end portion thereof arranged for clutching engagement on the arcuate periphery of said segment, and a link pivoted at its one end relative to the back plate on the center of the arc of said arcuate periphery and pivotally connected at its other end with the last mentioned toggle link inwardly from the end portion thereof carrying said shoe.

5. A clutch as set forth in claim 4, including spring means tending normally to urge the last mentioned link toward a limit position with respect to the back plate, whereby to hold the shoe in a predetermined position relative to the back plate when the clutch is engaged and the shoe is disengaged from the arcuate periphery.

6. A clutch as set forth in claim 4, including spring means tending normally to urge the last mentioned link toward a limit position with respect to the back plate, whereby to hold the shoe in a predetermined position relative to the back plate when the clutch is engaged and the shoe is disengaged from the arcuate periphery, said spring means also serving to hold the toggle links yieldingly in their one extreme position corresponding to the engaged position of the clutch.

7. In a clutch comprising a driving element and a driven element, a pressure plate for holding the driving and driven elements frictionally engaged, a back plate, and spring means acting between the back plate and pressure plate tending normally to urge the pressure plate toward engaged position, clutch actuating mechanism comprising a member extending rearwardly from the pressure plate adapted to retract the pressure plate against action of said spring means, a throw-out member, pivotally connected toggle links operated by the throw-out member over dead-center for engagement and disengagement of the clutch, and means for frictionally connecting and disconnecting one of said toggle links with the pressure plate retracting member arranged to hold the pressure plate in disengaged position against action of its spring means in one limit position of the toggle links, but release said pressure plate in the other extreme position of said toggle links and accordingly allow full engagement of the clutch under pressure of said spring means regardless of wear of the frictionally engaging surfaces of the driving and driven elements.

8. In a clutch comprising a driving element and a driven element, a pressure plate for holding the driving and driven elements frictionally engaged, a back plate, and spring means acting between the back plate and pressure plate tending normally to urge the pressure plate toward engaged position, clutch actuating mechanism comprising a member extending rearwardly from the pressure plate adapted to retract the pressure plate against action of said spring means, a throw-out member, pivotally connected toggle links operated by the throw-out member over dead-center for engagement and disengagement of the clutch, and a frictional clutching device for frictionally connecting one of said toggle links and the aforesaid pressure plate retracting member, said device comprising a clutch drum rotatably mounted on the back plate and pivotally connected with the rear end of said pressure plate retracting member, the associated toggle link being also pivoted relative to said back plate and drum, and a clutch band disposed in operative relation to said drum and operated by the aforesaid toggle link so as to turn the drum with the link in the pivotal movement thereof in one direction.

9. In a clutch actuating mechanism, the combination with a pair of clutch elements forming the gripping portions of a friction clutch, of a bell-crank lever pivotally mounted intermediate its ends on one of the clutch elements and operatively associated at one of its ends with the other of said clutch elements, the other end being segmental-shaped and having an arcuate periphery struck on an arc with the pivot for said lever as the center, a manually operable throw-out collar movable back and forth relative to said bell-crank lever, a pair of pivotally connected toggle links, one of which is pivotally connected with said throw-out collar and the other of which is in the form of a bell-crank lever, one end portion of which is adapted to move along the arcuate periphery of the first bell-crank lever and be frictionally clutched thereon at different selected positions by pivotal movement relative thereto, and means for guiding the second bell-crank lever in its arcuate movement relative to the first bell-crank lever and so as to allow pivotal movement thereof for clutching and declutching.

10. A clutch actuating mechanism as set forth in claim 9, wherein the toggle links are operable by the throw-out collar past a dead-center position, whereby to lock the mechanism in an actuated position.

11. Clutch actuating mechanism as set forth in claim 9, including spring means for retracting the second bell-crank lever to a limit position when in declutched relationship to the first bell-crank lever.

12. In a clutch actuating mechanism, the combination with a pair of clutch elements forming the gripping portions of a friction clutch, of a bell-crank lever pivotally mounted intermediate its ends on one of the clutch elements and operatively associated at one of its ends with the other of said clutch elements, the other end being segmental-shaped and having an arcuate periphery struck on an arc with the pivot for said lever as the center, a manually operable throw-out collar movable back and forth relative to said bell-crank lever, a pair of pivotally connected toggle links, one of which is pivotally connected with said throw-out collar and the other of which is in the form of a bell-crank lever, one end portion of which is adapted to move along the arcuate periphery of the first bell-crank lever and be frictionally clutched thereon at different selected positions by pivotal movement relative thereto, and a link pivotally supported at one end on a center coincident with the center of the aforesaid arcuate periphery and pivotally connected at its other end with the second bell-crank lever intermediate the ends thereof, whereby to guide the latter in its arcuate movement relative to the first bell-crank lever and allow pivotal movement thereof for clutching and declutching.

13. Clutch actuating mechanism as set forth in claim 12, including spring means for retracting the last mentioned link to an extreme position when the second bell-crank lever is in declutched relation to the arcuate periphery of the first bell-crank lever.

14. In a clutch actuating mechanism the combination with a pair of clutch elements forming the gripping portions of a friction clutch, of a link pivotally connected to one of said elements at one end and pivotally connected at its other end to a clutching drum that is pivotally mounted on the other of said elements, a manually operable throw-out collar movable back and forth relative to said clutching drum, a pair of pivotally connected toggle links, one of which is pivotally connected with said throw-out collar and the other of which is pivoted on the same center with said drum, and a clutching band in operative relationship to said drum and operated by pivotal movement in one direction of the last mentioned toggle link, whereby to turn the drum with said link.

15. A clutch actuating mechanism as set forth in claim 14, including spring means tending to move the clutching band in one direction toward a limit position.

16. A clutch actuating mechanism as set forth in claim 14, wherein the toggle links are operable by the throw-out collar past a dead-center position, whereby to lock the mechanism in an actuated position.

17. An infinitely adjustable operating connection adapted for the purpose described comprising, in combination, an oscillatable bell-crank member pivoted intermediate its ends on a support and adapted to be connected at one end to an element to be actuated thereby, a reciprocating member movable toward and away from the support, pivotally connected toggle links operated by the reciprocating member over dead-center, the other end portion of said bell-crank member being segmental-shaped and having an arcuate periphery, one of the toggle links carrying a shoe on one end portion thereof for clutching engagement on the arcuate periphery of said segment, and a link pivoted at its one end relative to the support on the center of the arc of said arcuate periphery and pivotally connected at its other end with the last mentioned toggle link inwardly from the end portion thereof carrying said shoe.

18. A structure as set forth in claim 17, including spring means tending normally to urge the last mentioned link toward a limit position with respect to the support, whereby to hold the shoe in a predetermined position relative to the support when the reciprocating member is in one limit position and the shoe is disengaged from the arcuate periphery.

19. A structure as set forth in claim 17, including spring means tending normally to urge the last mentioned link toward a limit position with respect to the support, whereby to hold the shoe in a predetermined position relative to the support when the reciprocating member is in one limit position and the shoe is disengaged from the arcuate periphery, said spring means also serving to hold the toggle links yieldingly in their one extreme position corresponding to the other extreme position of said reciprocating member.

20. An infinitely adjustable operating connection adapted for the purpose described comprising, in combination, an oscillatable member pivoted on a support and adapted to be connected to an element to be actuated thereby and having an arcuate periphery on one end struck on an arc with the pivot for said member as its center, a reciprocating member movable toward and away from the support, a pair of pivotally connected toggle links one of which is pivotally connected with the reciprocating member and the other of which is in the form of a bell-crank lever, one end portion of which is adapted to move along the arcuate periphery of the oscillatable member and be frictionally clutched thereon at different selected positions by pivotal movement relative thereto, and means for guiding the bell-crank lever in its arcuate movement relative to the oscillatable member and so as to allow pivotal movement thereof for clutching and declutching.

21. A structure as set forth in claim 20, wherein the toggle links are operable by the reciprocating member past a dead-center position, whereby to lock the parts in an actuated position.

22. A structure as set forth in claim 20, including spring means for retracting the bell-crank lever to a limit position when in declutched relationship to the bell-crank member.

23. An infinitely adjustable operating connection adapted for the purpose described comprising, in combination, an oscillatable bell-crank member pivoted intermediate its ends on a support and adapted to be connected at one end to an element to be actuated thereby and having an arcuate periphery on its other end struck on an arc with the pivot for said member as its center, a reciprocating member movable toward and away from the support, a pair of pivotally connected toggle links, one of which is pivotally connected with the reciprocating member and the other of which is in the form of a bell-crank lever, one end portion of which is adapted to move along the arcuate periphery of the bell-crank member and be frictionally clutched thereon at different selected positions by pivotal movement relative thereto, and a link pivotally supported at one end on a center coincident with the center of the aforesaid arcuate periphery and pivotally connected at its other end with the bell-crank member intermediate the ends thereof, whereby to guide the latter in its arcuate movement relative to the bell-crank member and allow pivotal movement thereof for clutching and declutching.

24. A structure as set forth in claim 23, including spring means for retracting the last mentioned link to an extreme position when the bell-crank lever is in declutched relation to the arcuate periphery of the bell-crank member.

25. An infinitely adjustable operating connection adapted for the purpose described comprising, in combination, a link pivotally connected at one end to an element to be reciprocated thereby, a reciprocating member movable toward and away from a support, and means including two connectible and disconnectible elements mounted on said support and providing an operating connection between the aforesaid link and the reciprocating member, and clutching means for said last mentioned elements arranged to automatically disconnect said elements upon operation of said reciprocating member to one limit position and arranged to automatically connect said elements again in the reverse movement of said reciprocating member toward its other extreme position.

26. A structure as set forth in claim 25, including spring means urging the clutching means toward a limit position when the reciprocating member is in one extreme position and the connectible elements are disconnected.

27. An infinitely adjustable operating connection adapted for the purpose described comprising, in combination, a link pivotally connected at one end to an element to be reciprocated thereby and pivotally connected at its other end to a clutching drum that is pivotally mounted on a support, a reciprocating member movable toward and away from the support, a pair of pivotally connected toggle links, one of which is pivotally connected with the reciprocating member and the other of which is pivoted on the same center with said drum, and a clutching hand in operative relationship to said drum and operated by pivotal movement in one direction of the last mentioned toggle link, whereby to turn the drum with said link.

28. A structure as set forth in claim 27, including spring means tending to move the clutching band in one direction toward a limit position.

29. A structure as set forth in claim 27, wherein the toggle links are operable by the throw-out collar past a dead-center position, whereby to lock the mechanism in an actuated position.

30. A clutch actuating mechanism as set forth in claim 12, wherein the toggle links are operable by the throw-out collar past a dead-center position, whereby to lock the mechanism in an actuated position.

KAY MILLER.

REFERENCES CITED

The following references are of record in the file of this patent:

UNITED STATES PATENTS

| Number | Name | Date |
| --- | --- | --- |
| 2,036,004 | Wemp | Mar. 31, 1936 |
| 2,057,803 | Tatter | Oct. 20, 1936 |
| 2,129,361 | Ruesonberg et al. | Sept. 6, 1938 |
| 2,251,366 | Miller et al. | Aug. 5, 1941 |
| 2,287,630 | Miller | June 23, 1942 |